(12) United States Patent
Lei et al.

(10) Patent No.: US 11,902,215 B2
(45) Date of Patent: Feb. 13, 2024

(54) METHOD AND APPARATUS FOR RESOURCE MAPPING IN UNLICENSED SPECTRUM

(71) Applicant: LENOVO (BEIJING) LIMITED, Beijing (CN)

(72) Inventors: Haipeng Lei, Beijing (CN); Alexander Golitschek Edler Von Elbwart, Darmstadt (DE)

(73) Assignee: Lenovo (Beijing) Limited, Beijing (CN)

(*) Notice: Subject to any disclaimer, the term of this patent is extended or adjusted under 35 U.S.C. 154(b) by 433 days.

(21) Appl. No.: 17/430,646

(22) PCT Filed: Feb. 15, 2019

(86) PCT No.: PCT/CN2019/075296
§ 371 (c)(1),
(2) Date: Aug. 12, 2021

(87) PCT Pub. No.: WO2020/164155
PCT Pub. Date: Aug. 20, 2020

(65) Prior Publication Data
US 2023/0026357 A1  Jan. 26, 2023

(51) Int. Cl.
*H04L 5/00* (2006.01)
*H04L 1/1829* (2023.01)
*H04W 74/08* (2009.01)

(52) U.S. Cl.
CPC .......... *H04L 5/0092* (2013.01); *H04L 1/1861* (2013.01); *H04W 74/0808* (2013.01)

(58) Field of Classification Search
None
See application file for complete search history.

(56) References Cited

U.S. PATENT DOCUMENTS

2016/0338050 A1* 11/2016 Kim .................. H04W 4/70
2017/0127382 A1   5/2017 Zhang et al.
(Continued)

FOREIGN PATENT DOCUMENTS

| CN | 106658742 A | 5/2017 |
| KR | 20200032795 A * | 3/2020 |
| WO | 2018204136 A1 | 11/2018 |

OTHER PUBLICATIONS

International Searching Authority, "Written Opinion of the International Searching Authority," PCT/ CN2019/075296, dated Nov. 7, 2019, pp. 1-4.
(Continued)

*Primary Examiner* — Kenny S Lin
(74) *Attorney, Agent, or Firm* — Kunzler Bean & Adamson

(57) ABSTRACT

Embodiment of the present disclosure relates to methods and apparatuses for resource mapping in unlicensed spectrum. According to an embodiment of the present disclosure, a method can include: receiving data on a first set of subbands, wherein the data is a part of a transport block (TB), the first set of subbands is a subset of a second set of subbands, the second set of subbands is allocated for the TB, and each subband of the second set of subbands has been performed a channel access procedure; determining a type of resource mapping of the TB, wherein the resource mapping includes mapping modulated complex symbols of the TB to resource blocks of the second set of subbands; and decoding the data based on the determined type of resource mapping. Embodiments of the present disclosure propose a technical solution for resource mapping in unlicensed spectrum, which can improve the channel utilization efficiency of NR.

20 Claims, 10 Drawing Sheets

(56) References Cited

U.S. PATENT DOCUMENTS

| | | | |
|---|---|---|---|
| 2018/0076924 A1* | 3/2018 | Lee | H04L 5/0094 |
| 2018/0115981 A1* | 4/2018 | Kim | H04W 72/1215 |
| 2021/0307068 A1* | 9/2021 | Kim | H04B 7/0695 |
| 2022/0078843 A1* | 3/2022 | Rosa | H04L 5/0044 |

OTHER PUBLICATIONS

Huawei, Hisilicon, Coexistence and channel access for NR unlicensed band operations, 3GPP TSG RAN WG1 Meeting #94, R1-1808061, Aug. 20-24, 2018, pp. 1-8, Gothenburg, Sweden.

LG Electronics, Frame structure for NR unlicensed operation, 3GPP TSG RAN WG1 Meeting #94bis, R1-1810266, Oct. 8-12, 2018, pp. 1-6, Chengdu, China.

* cited by examiner

METHOD AND APPARATUS FOR RESOURCE MAPPING IN UNLICENSED SPECTRUM

TECHNICAL FIELD

Embodiments of the present disclosure generally relate to wireless communication technology, especially to a method and an apparatus for resource mapping in unlicensed spectrum.

BACKGROUND

In 3GPP 5G new radio (NR), very wide carrier bandwidth is supported, for example, up to 100 MHz carrier bandwidth for frequency range 1 (FR1, 450 MHz-6000 MHz) and up to 400 MHz carrier bandwidth for frequency range 2 (FR2, 24250 MHz-52600 MHz). The unlicensed spectrum at 5.7 GHz has a wide bandwidth up to hundreds of MHz, which is also supported in NR access on unlicensed spectrum (NR-U).

Listen Before Talk (LBT) or sometimes Listen Before Transmit (LBT) or clear channel assessment (CCA) is a channel access technique, and used for transmission on an unlicensed spectrum. In order to achieve fair coexistence with other wireless systems, LBT is required before a transmitter can start the transmission on an unlicensed spectrum. LBT is executed by performing energy detection on a certain channel. If the detected power of the channel is below a predefined threshold, LBT is successful, which suggests that the channel is deemed as empty and available for transmission. Only when LBT is successful, can the transmitter start the transmission on the channel and occupy the channel up to the maximum channel occupancy time (MCOT). Otherwise, if the detected power of the channel exceeds a predefined threshold, LBT is failed. Accordingly, the transmitter cannot start the transmission and will continue performing LBT until a successful LBT is obtained.

In order to achieve fair coexistence with Wi-Fi, it is agreed that NR-U operating bandwidth is an integer multiple of 20 MHz, and LBT is performed in units of 20 MHz bandwidth.

When a transport block (TB) is scheduled to be transmitted on a wideband carrier of unlicensed spectrum, not all the portions of the unlicensed carrier are available for the TB transmission because the results of the LBT for the portions may be successful or failed. Therefore, resource mapping for data to be transmitted on the unlicensed bandwidth should be specially solved.

SUMMARY OF THE APPLICATION

One objective of embodiments of the present disclosure is to provide a technical solution for resource mapping in unlicensed spectrum.

According to an embodiment of the present disclosure, a method may include: receiving data on a first set of subbands, wherein the data is a part of a transport block (TB), the first set of subbands is a subset of a second set of subbands, the second set of subbands is allocated for the TB, and each subband of the second set of subbands has been performed a channel access procedure; determining a type of resource mapping of the TB, the resource mapping includes mapping modulated complex symbols of the TB to resource blocks of the second set of subbands; and decoding the data based on the determined type of resource mapping.

In an embodiment of the present disclosure, the type of resource mapping may include subband-based resource mapping. The subband-based resource mapping may include mapping the modulated complex symbols to the resource blocks in an increasing index order of subbands of the second set of subbands; and within each subband of the second set of subbands, the mapping is performed first in frequency domain and then in time domain.

In another embodiment of the present disclosure, the type of resource mapping may include wideband-based resource mapping. The wideband-based resource mapping may include mapping the modulated complex symbols to the resource blocks first in frequency domain across all subbands of the second set of subbands and then in time domain.

According to another embodiment of the present disclosure, a method may include: determining a type of resource mapping of a transport block (TB) on a second set of subbands allocated to transmit the TB, the resource mapping includes mapping modulated complex symbols of the TB to resource blocks of the second set of subbands; performing a channel access procedure on each subband of the second set of subbands; and transmitting data on a first set of subbands, the data is a part of the TB, and the first set of subbands includes one or more subbands of the second set of subbands with successful channel access procedure.

According to yet another embodiment of the present disclosure, an apparatus may include: at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement a method according to an embodiment of the present disclosure with the at least one receiver, the at least one transmitter and the at least one processor.

Embodiments of the present disclosure provide a technical solution for resource mapping in unlicensed spectrum, which can improve the channel utilization efficiency of NR. Accordingly, embodiments of the present disclosure can facilitate the implementation of NR.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G, 3GPP Long Term Evolution (LTE) Release 8 and so on. Persons skilled in the art know very well that, with the development of network architecture and new service scenarios, the embodiments in the present disclosure are also applicable to similar technical problems.

Figure 1:
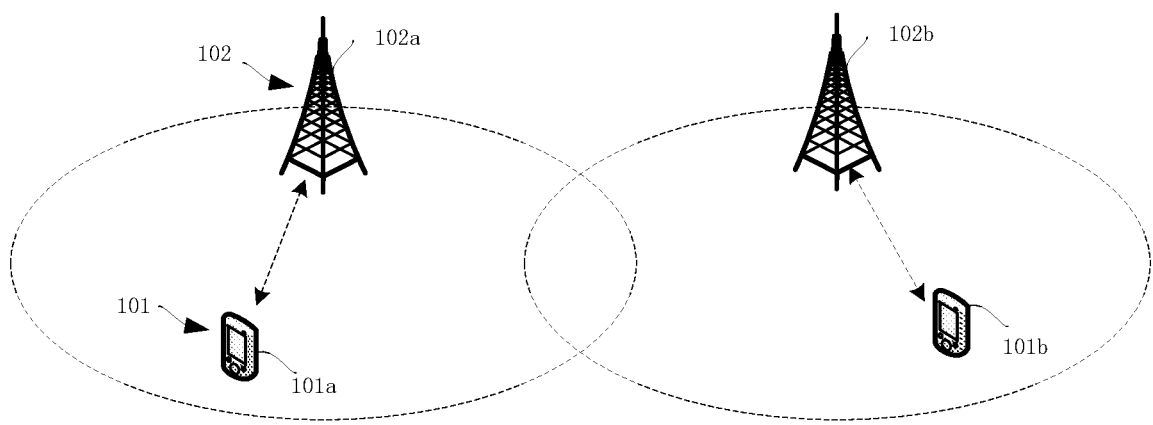
FIG. 1 is a schematic diagram illustrating an exemplary wireless communication system 100 according to an embodiment of the present disclosure.

FIG. 1 is a schematic diagram illustrating an exemplary wireless communication system 100 according to an embodiment of the present disclosure.

As shown in FIG. 1, the wireless communication system 100 includes at least one user equipment (UE) 101 and at least one base station (BS) 102. In particular, the wireless communication system 100 includes two UEs 101, e.g., a first UE 101a and a second UE 101b and two BSs 102, e.g., a first BS 102a and a second BS 102b for illustrative purpose. Although a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UEs 101 include wearable devices, such as smart watches, fitness bands, optical head-mounted displays, or the like. Moreover, the UEs 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UEs 101 may communicate directly with the BSs 102 via uplink (UL) communication signals.

The BSs 102 may be distributed over a geographic region. In certain embodiments of the present disclosure, each of the BSs 102 may also be referred to as an access point, an access terminal, a base, a macro cell, a Node-B, an evolved Node B (eNB), a gNB, a Home Node-B, a relay node, or a device, or described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In an embodiment of the present disclosure, the wireless communication system 100 is compatible with the 5G new radio of the 3GPP protocol, wherein the BSs 102 transmit data using an orthogonal frequency division multiplexing (OFDM) modulation scheme on the downlink (DL) and the UEs 101 transmit data on the uplink (UL) using a single-carrier frequency division multiple access (SC-FDMA) or OFDM scheme. More generally, however, the wireless communication system 100 may implement some other open or proprietary communication protocols, for example, WiMAX, among other protocols.

In another embodiment of the present disclosure, the BSs 102 may communicate using other communication protocols, such as the IEEE 802.11 family of wireless communication protocols. Further, in some embodiments of the present disclosure, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In yet another embodiment of present disclosure, the BSs 102 may communicate with the UEs 101 using the 3GPP 5G protocols.

Wireless signal transmission on an unlicensed spectrum should meet the requirements of regulation subject to the management of the located country or region. Hence, the design of uplink transmission for NR-U, for example, Physical Uplink Shared Channel (PUSCH) or Physical Uplink Control Channel (PUCCH), should meet the regulation requirements on unlicensed spectrum.

The requirements include:

Occupied Channel Bandwidth (OCB): the bandwidth containing 99% of the power of the signal, shall be between 80% and 100% of declared Nominal Channel Bandwidth;

Maximum Power Spectrum Density (PSD) with a resolution bandwidth of 1 MHz, e.g., 10 dBm/MHz.

These two requirements suggest that a signal which occupies a small portion of the channel bandwidth cannot be transmitted at the maximum available power at the UE 102 due to the PSD and OCB constraints.

In addition, TB-based retransmission is supported in NR for hybrid automatic repeat request acknowledgement (HARQ-ACK) feedback. For the TB-based retransmission, one HARQ-ACK feedback bit corresponds to one TB. As long as one CB of a given TB is not correctly decoded at the receiver side, the receiver side will report a "Non-Acknowledgement (NACK)" for the given TB to the transmitter side, and the transmitter side has to retransmit all the CBs of the given TB. Assuming one HARQ-ACK feedback bit corresponds to one CB, the transmitter side can know the decoding state of each transmitted CBG, so it can only retransmit the failed CB(s). Thus, the retransmission efficiency is higher than the TB-based retransmission. However, the HARQ-ACK feedback overhead may be huge.

In order to balance the number of the HARQ-ACK feedback bits and the retransmission efficiency, the concept of CBG (code block group) is introduced and the CBG-based retransmission is also supported in NR. Basically, the intention of CBG is to group several CBs into one CBG so that HARQ-ACK feedback can be generated per CBG. Only all the CBs within one CBG are correctly decoded, the receiver side may send "ACK" for the CBG to the transmitter side. Otherwise, the receiver side may send "NACK" for the CBG to the transmitter side. After receiving the HARQ-ACK feedback, the transmitter side can only retransmit the CBG(s) with "NACK".

For the CBG-based retransmission, the maximum number of CBGs per TB may be configured by a radio resource control (RRC) signalling. For example, the maximum number of CBGs per TB may be 2, 4, 6 and 8. For both semi-static HARQ-ACK codebook and dynamic HARQ-ACK codebook, the number of HARQ-ACK bits for one TB is equal to the configured maximum number of CBGs per TB, regardless of the variable TBS (transport block size) of a given TB.

Figure 2:
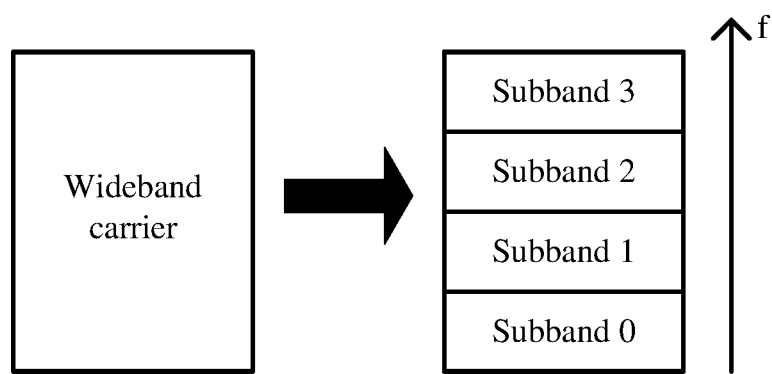
FIG. 2 is a schematic diagram illustrating a subband-based transmission scheme according to an embodiment of the present disclosure.

For NR-U, when an operation bandwidth is larger than 20 MHz, e.g., 40/60/80/100 MHz, sub-band operation is needed. FIG. 2 is a schematic diagram illustrating an exemplary subband-based transmission scheme according to an embodiment of the present disclosure, wherein "f" means "frequency domain."

In FIG. 2, a wideband carrier is divided into four subbands named Subband 0, Subband 1, Subband 2, and Subband 3, respectively. Persons skilled in the art can understand that the name "subbands" and the number of the subbands are only for illustrative purpose, the name "subbands" may also refer to "bandwidth portion" or "bandwidth part (BWP)" or "LBT subband" etc. Moreover, the number of the subbands may be N, wherein N is an integer and N>=1. Each subband is assigned with an index. In an embodiment of the present disclosure, Index 0 is assigned to the subband with the lowest frequency in the wideband carrier, and Index 1, Index 2, . . . and Index N-1 are assigned to corresponding subbands respectively in the ascending order of frequency. In another embodiment of the present disclosure, Index 0 is assigned to the subband with highest frequency in the wideband carrier, and Index 1, Index 2, . . . and Index N-1 are assigned to corresponding subbands respectively in the descending order of frequency. In an embodiment of the present disclosure, subband indices are ordered within the wideband carrier. In another embodiment of the present disclosure, subband indices are ordered within the assigned subbands for Physical Downlink Shared Channel (PDSCH)/PUSCH transmission of the wideband carrier. Each subband may have the same or different bandwidths, and may be less than, equal to, or larger than 20 MHz. In a preferred embodiment of the present disclosure, each subband has the same bandwidth with 20 MHz.

For the wideband carrier on unlicensed spectrum, there are two operations:

Carrier Aggregation (CA)-based operation; and

Subband-based operation.

In the CA-based approach, similar to Licensed Assisted Access (LAA) or Enhanced LAA (eLAA) of LTE, a UE 101 or a BS 102 performs an LBT or in other words CCA test upon each carrier, based on a multi-carrier LBT operation specified in LTE LAA or eLAA, then transmit data on each available carrier.

Alternatively, in the subband-based operation, the UE 101 or the BS 102 performs an LBT test upon each subband and aggregates available subbands for a single PUSCH or PDSCH transmission. For example, when some results of the LBT test with respect to some subbands indicate success while some results of the LBT test with respect to other subbands indicate failure, then the UE 101 or the BS 102 may transmit data on the subbands with the successful result of the LBT test, and not transmit data on the subbands with the failed result of the LBT test.

For example, in an embodiment of the present disclosure, during the DL transmission, a BS 102 may perform an LBT test upon each subband. As shown in FIG. 2, assuming that the results of the LBT test on Subband 2 and Subband 3 are successful, that means Subband 2 and Subband 3 are allowed to be utilized for DL data transmission. In another embodiment of the present disclosure, during the UL transmission, after receiving the UL grant, a UE 101 may prepare a single PUSCH according to the UL grant. The UE 101 may perform an LBT test upon each subband of the allocated subbands in response to more than one subband being allocated. As shown in FIG. 2, assuming that the results of LBT test with respect to Subband 2 and Subband 3 are successful, that means Subband 2 and Subband 3 are allowed to be utilized for UL transmission.

For the CA-based operation (i.e. the CA-based LBT), less standard impact is introduced when using LTE-based LAA as baseline and it also requires less stringent processing requirements because each TB is processed independently on each Component Carrier (CC). However, additional guard-band(s) are required between contiguous carriers for the CA.

On the other hand, the subband-based operation (i.e. the subband-based LBT) has two features: (1) there is no need to place the guard-band(s) between contiguous subbands, therefore the spectral efficiency is improved compared to CA-based operation; and (2) dynamic spectrum usage is realized with finer granularity of LBT bandwidth.

Nevertheless, during data communication, the scheduling decision is made before performing a LBT test. When a TB is determined to be transmitted on a wide frequency band, for instance, the wideband carrier in FIG. 2, subject to results of LBT tests, not necessary all the subbands are available for the TB transmission at the same time. Methods for overcoming said situation may include: (1) rate matching on the available subbands; or (2) puncturing the data prepared on the unavailable subbands.

For the DL transmission, with the rate matching method, a high coding rate may be caused in order to transmit the scheduled TB only in the available subbands and the coding rate is variable dependent on the number of available subbands. Moreover, a BS 102 may not have enough processing time to perform rate matching, because there is nearly no extra time from the time instant when the LBT result is considered successful to the time instant that BS 102 starts DL transmission.

For the DL transmission with the puncturing method, a portion of a TB that is mapped to the subband with a failed LBT result is punctured. Although it is more simple compared to the rate matching method, it may lead to failure of TB decoding at a UE side when too many portions of the TB are punctured.

Similar issues may happen to a UL transmission. With the rate matching method, high coding rate may be caused in order to transmit the scheduled TB only in the available subbands and the coding rate is variable dependent on the number of available subbands. Moreover, a UE 101 may not have enough processing time to perform rate matching, because there is nearly no extra time from the time instant when the LBT result is considered successful to the time instant that UE 101 starts UL transmission.

For the UL transmission with the puncturing method, a portion of a TB that is mapped to the subband with a failed LBT result is punctured. Although the puncturing method is more simple compared with the rate matching method, it may lead to a failure of TB decoding at a gNB side when too many portions of the TB are punctured.

Some embodiments of the present disclosure provide methods to solve the aforementioned issues of the subband operation approach, and therefore improving channel utilization efficiency.

More details on the embodiments of the present disclosure will be illustrated in the following text in combination with the appended drawings.

Figure 3:
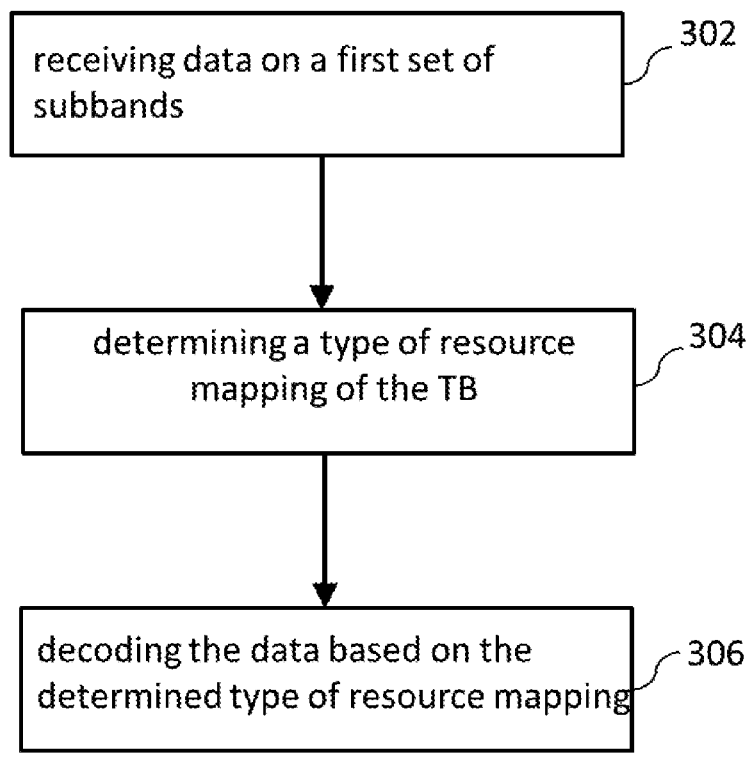
FIG. 3 is a flow chart illustrating a method for resource mapping in unlicensed spectrum according to an embodiment of the present disclosure.

FIG. 3 is a flow chart illustrating a method for resource mapping in unlicensed spectrum according to an embodiment of the present disclosure. The method may be implemented in a DL transmission by a UE 101 or in a UL transmission by a BS 102 in an exemplary wireless communication system 100 as shown in FIG. 1.

As shown in FIG. 3, in step 302, the UE 101 or the BS 102 may receive data on a first set of subbands including at least one subband. The data may be a part of a TB and a second set of subbands may be allocated for the TB. The first set of subbands is a subset of the second set of subbands. Each subband of the second set of subbands may have been performed a channel access procedure. The channel access procedure may refer to a LBT test or CCA test.

In some embodiments of the present disclosure, the step 302 may be performed by a UE 101, for example, the first UE 101a or second UE 101b. In this case, the data may be for downlink transmission, for example the data in PDSCH. Before receiving the downlink transmission data, the UE 101 may receive downlink control information (DCI) from a BS 102, which schedules a second set of subbands in a wideband carrier for transmitting the TB including the received data. For example, the first UE 101a receives DCI from the first BS 102a or the second UE 101b receives DCI from the second BS 102b. The wideband carrier includes a plurality of subbands, and the second set of subbands may be a portion or all of the plurality of subbands. The BS 102 may perform an LBT test on each subband of the second set of subbands for transmitting the TB. According to a result of the LBT test, at least one subband of the second set of subbands, for example, a first set of subbands may be available for the downlink transmission, which means the result of the LBT test of the at least one subband is successful. The BS 102 may transmit the data on the at least one subband, for example the first set of subbands by using the rate matching method or puncturing method. In the case of using the rate matching method, all data of the TB may be transmitted on the first set of subbands. In the case of using the puncturing method, instead of all data of the TB, a portion of the TB, for example, the data which has been prepared to be transmitted on the first set of subbands may be transmitted on the first set of subbands. Correspondingly, the UE 101 may receive the data transmitted on the first set of subbands from the BS 102, and the received data may be a portion of the TB or all of the TB.

In some embodiments of the present disclosure, the step 302 may be performed by a BS 102, for example the first BS 102a or the second BS 102b. In this case, the data may be for uplink transmission, for example the data in PUSCH. Before receiving the uplink transmission data, the BS 102 may transmit the UL grant to the UE 101, which schedules a second set of subbands in a wideband carrier for transmitting the TB. For example, the first BS 102a may transmit a UL grant to the first UE 101a, or the second BS 102b may transmit a UL grant to the second UE 101b. The wideband carrier includes a plurality of subbands, and the second set of subbands may be a portion or all of the plurality of subbands. The UE 101 may perform an LBT test on each subband of the second set of subbands. According to a result of the LBT test, at least one subband of the second set of subbands, for example, a first set of subbands may be available for the uplink transmission, which means the result of the LBT test of the first set of subbands is successful, and the UE 101 may transmit the data on these subbands by using the rate matching mechanism or puncture mechanism. In the case of using the rate matching mechanism, all data of the TB may be transmitted on the first set of subbands. In the case of using the puncture mechanism, instead of all data of the TB, a portion of the TB, for example, the data which has been prepared to be transmitted on the first set of subbands may be transmitted on the first set of subbands. Correspondingly, the BS 102 may receive the data transmitted on the first set of subbands from the UE 101, and the data may be a portion of TB or all of the TB.

Each subband may have the same or different bandwidths, which may be less than, equal to, or larger than 20 MHz. In a preferred embodiment, each subband has the same bandwidth in frequency, for example 20 MHz. Each subband of the second set of subbands may include a positive integer number of CBGs. That is, the CBG construction is restricted within each subband and not across the subband boundary of each subband.

In step 304, the UE 101 or the BS 102 may determine a type of resource mapping of the TB. The resource mapping may include mapping the modulated complex symbols of the TB to resource blocks (RBs) of the second set of subbands.

In some embodiments of the present disclosure, the type of resource mapping may include subband-based resource mapping. According to an embodiment of the present disclosure, the subband-based resource mapping may include mapping the modulated complex symbols to the resource blocks in an increasing index order of subbands of the second set of subbands. Within each subband of the second set of subbands, the mapping may be performed first in frequency domain and then in time domain. Each resource block may have 12 consecutive subcarriers. "First in frequency domain and then in time domain mapping" means first mapping the modulated complex symbols in the resource elements in one symbol in an increasing index order of the subcarrier from the first subcarrier in the lowest-numbered resource block assigned for transmission, and then mapping the modulated complex symbols in the next symbol in an increasing index order of the subcarrier from the first subcarrier in the lowest-numbered resource block assigned for transmission. One resource element may be represented as (k, l), where k is the subcarrier index and l is the symbol index. Accordingly, "frequency-first and time-second mapping" may be performed by mapping the modulated complex symbols in an increasing order of first the index of k over the assigned resource blocks, where k=0 is the first subcarrier in the lowest-numbered resource block assigned for transmission, and then the index of l in time domain. According to another embodiment, the subband-based resource mapping may include mapping the modulated complex symbols to the resource blocks in an increasing index order of subbands of the second set of subbands. Within each subband of the second set of subbands, the mapping is performed first in frequency domain in an increasing index order of the subcarriers of the subband and then in time domain.

Figure 4:
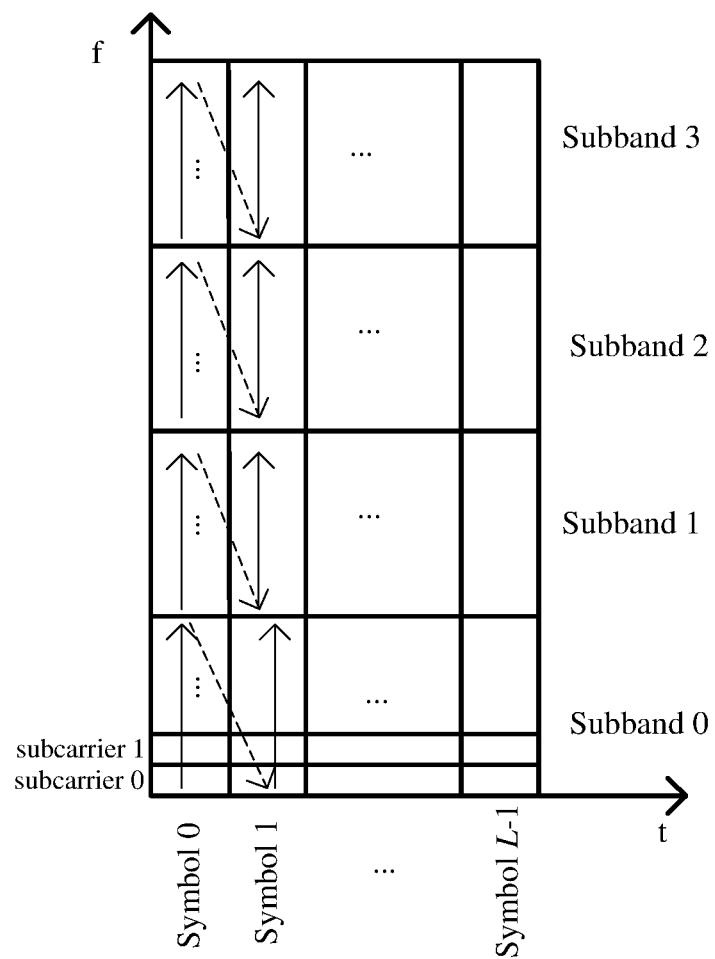
FIG. 4 is a schematic diagram illustrating subband-based resource mapping according to an embodiment of the present disclosure.

For example, FIG. 4 is a schematic diagram illustrating subband-based resource mapping according to an embodiment of the present disclosure, wherein "f" means frequency domain and "t" means time domain. The arrows on the subbands in FIG. 4 schematically illustrate the resource mapping order on the subbands. As shown in FIG. 4, four subbands, i.e., Subband 0, Subband 1, Subband 2, and Subband 3 are allocated for transmitting a TB during a downlink transmission or uplink transmission. It is assumed that each subband has the same bandwidth. Persons skilled in the art can understand that four subbands with the same bandwidth are only used for illustrative purpose only. In some embodiments of the present disclosure, other numbers of slots and subbands may be allocated for transmitting the TB and the subbands may have different bandwidths.

The modulated complex symbols of the TB are mapped to the resource blocks in an increasing index order of subbands within the allocated subbands. For example, staring from Subband 0, the modulated complex symbols of the TB are mapped to Subband 0, Subband 1, Subband 2, and Subband 3 sequentially.

In each subband, the mapping is performed first in frequency domain and then in time domain. One resource element of the subband may be represented as (k, l), where k is the subcarrier index and l is the symbol index. Accordingly, the modulated complex symbols are sequentially mapped in the resource blocks of the subband, in an increasing order of first the index of k over the assigned resource blocks, where k=0 is the first subcarrier in the lowest-numbered resource block assigned for transmission, and then the index of l in time domain. For example, in Subband 0, starting from Symbol 0, the modulated complex symbols of the TB are sequentially mapped to a resource element (0, 0) defined by subcarrier 0 of resource block 0 and Symbol 0, and then mapped to a resource element (1, 0) defined by subcarrier 1 of resource block 0 and Symbol 0. The mapping may be continued in an increasing index order of the subcarriers. At last, the modulated complex symbols of the TB may be mapped to a resource element (11, 0) defined by subcarrier 11 of resource block N−1 and Symbol 0, where N is the number of assigned resource blocks in the current subband. The same mapping order in Symbol 0 may be repeated for following symbols like Symbol 1, Symbol 2, . . . Symbol L−1 until the mapping has been accomplished in Subband 0, where L is the number of assigned symbols. Then the same mapping procedure in Subband 0 may be repeated for Subband 1, Subband 2, and Subband 3 sequentially.

In some embodiments of the present disclosure, the type of resource mapping may include wideband-based resource mapping. According to an embodiment of the present disclosure, the wideband-based resource mapping may include mapping the modulated complex symbols to the resource blocks first in frequency domain across all subbands of the second set of subbands and then in time domain. According to an embodiment of the present disclosure, the wideband-based resource mapping may include mapping the modulated complex symbols to the resource blocks first in frequency domain in an increasing index order of the subcarriers of the second set of subbands and then in time domain.

Figure 5:
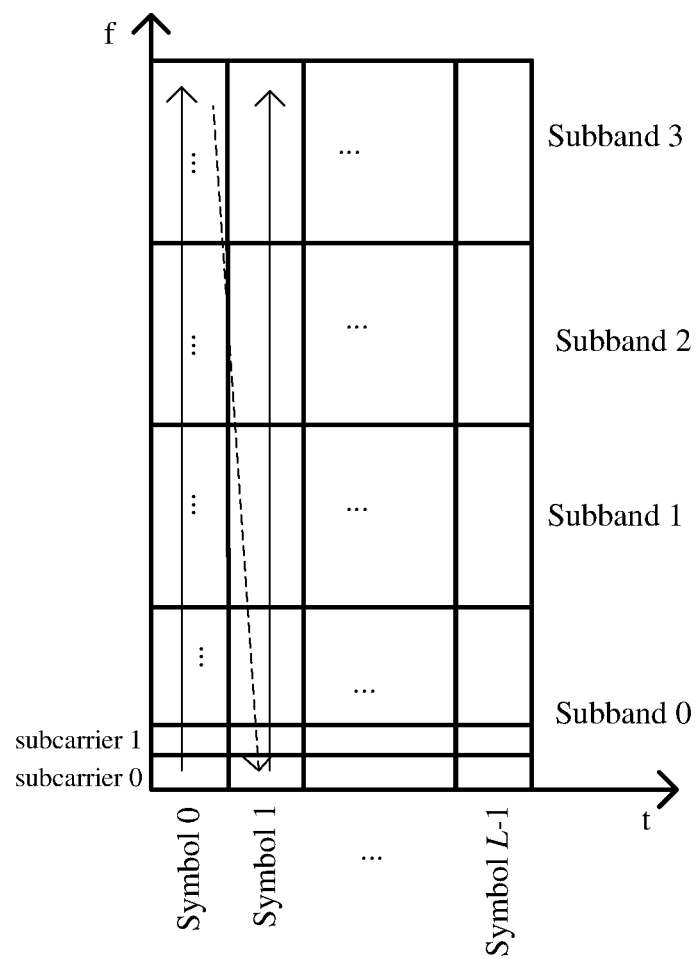
FIG. 5 is a schematic diagram illustrating wideband-based resource mapping according to another embodiment of the present disclosure.

For example, FIG. 5 is a schematic diagram illustrating wideband-based resource mapping according to an embodiment of the present disclosure, wherein "f" means frequency domain and "t" means time domain. The arrows on the subbands in FIG. 5 schematically illustrate the mapping order on the subbands.

As shown in FIG. 5, four subbands, i.e., Subband 0, Subband 1, Subband 2, and Subband 3 are allocated for transmitting a TB during a downlink transmission or uplink transmission. It is assumed that each subband has the same bandwidth. Persons skilled in the art can understand that four subbands with the same bandwidth are only used for illustrative purpose only. In some embodiments of the present disclosure, other numbers of subbands may be allocated for transmitting the TB and the subbands may have different bandwidths.

The modulated complex symbols of the TB are first mapped to the resource blocks in frequency domain across all allocated subbands and then in time domain. One resource element of the subband may be represented as (k, l), where k is the subcarrier index and l is the symbol index. Accordingly, the modulated complex symbols are sequentially mapped over the assigned resource blocks across all the allocated subbands, in an increasing order of first the index of k over the assigned resource blocks, where k=0 is the first subcarrier in the lowest-numbered resource block assigned for transmission, and then the index of l in time domain. For example, starting from Symbol 0, the modulated complex symbols of the TB are first mapped to a resource element (0, 0) defined by subcarrier 0 of resource block 0 and Symbol 0, and then mapped to a resource element (1, 0) defined by subcarrier 1 of resource block 0 and Symbol 0. The mapping may be continued in an increasing index order of the subcarriers. At last, the modulated complex symbols of the TB may be mapped to a resource element (11, 0) defined by subcarrier 11 of resource block N−1 and Symbol 0, where N is the number of assigned resource blocks across all the allocated subbands. The same mapping order in Symbol 0 may be repeated for following symbols like Symbol 1, Symbol 2, . . . Symbol L−1 until the mapping has been accomplished in the allocated four subbands, where L is the number of assigned symbols.

In some embodiments of the present disclosure, the step 304 may be performed by a UE 101, for example, the first UE 101*a* or the second UE 101*b*. According to an embodiment of the present disclosure, the UE 101 may always use the subband-based resource mapping. According to another embodiment of the present disclosure, the UE 101 may receive a RRC signaling indicating the type of resource mapping of the TB. According to yet another embodiment of the present disclosure, the UE 101 may receive an indicator in DCI, wherein the indicator may indicate the type of resource mapping of the TB. The indicator in DCI may be one bit with a value "0" or "1." For example, the value "0"

may indicate the type of the resource mapping is subband-based resource mapping and the value "1" may indicate that the type of the resource mapping is wideband-based resource mapping. In another example, the value "1" may indicate the type of the resource mapping is subband-based resource mapping and the value "0" may indicate that the type of the resource mapping is wideband-based resource mapping.

Figure 6:
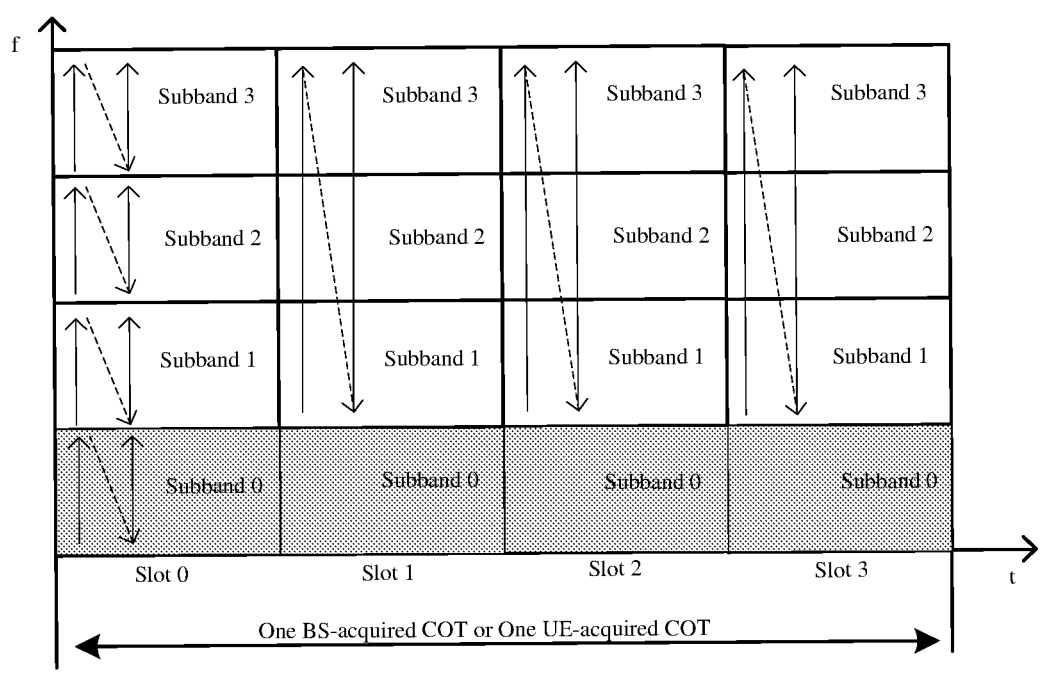
FIG. 6 is a schematic diagram illustrating switching the type of resource mapping according to an embodiment of the present disclosure.

According to yet another embodiment of the present disclosure, the type of resource mapping of the TB may be determined being subband-based resource mapping in response to the data received in an initial slot and being wideband-based resource mapping in response to the data received in a non-initial slot. For example, FIG. 6 illustrates how to determine the type of resource mapping in a BS-acquired channel occupancy time (COT) or a UE-acquired COT, wherein only one BS-acquired COT or UE-acquired COT is illustrated. Specifically, FIG. 6 is a schematic diagram illustrating switching the type of resource mapping according to an embodiment of the present disclosure, wherein "f" means frequency domain and "t" means time domain. The arrows on the subbands in FIG. 6 schematically illustrate the mapping order on the subbands.

In FIG. 6, for one BS-acquired COT, it may include four slots, i.e., Slot 0, Slot 1, Slot 2, and Slot 3 as an example. Slot 0 may refer to the initial slot. The duration of one slot depends on a certain subcarrier spacing in use, 1 ms for 15 kHz subcarrier spacing, 0.5 ms for 30 kHz subcarrier spacing and 0.25 ms for 60 kHz subcarrier spacing etc. Regardless of the slot duration, one slot includes 14 symbols. In some cases, a concept of "mini-slot" is also used as one short TTI (Transmission Time Interval) for downlink or uplink scheduling, named PDSCH Type B for downlink transmission or PUSCH Type B for uplink transmission. Usually, the number of symbols in one mini-slot is smaller than 14. Due to unpredictability of LBT in unlicensed spectrum, downlink or uplink transmission may cover a partial slot, also named sub-slot. In FIG. 6, four subbands, i.e., Subband 0, Subband 1, Subband 2, and Subband 3 are allocated for transmitting a TB in one slot. Persons skilled in the art can understand that four slots and four subbands are only used for illustrative purpose, and other numbers of slots and subbands taught or suggested in the present disclosure can also be used.

In FIG. 6, subband-based resource mapping may only be used in the initial slot because the BS 102 cannot predict in advance which subband will pass the LBT test and which subband fails. In the initial slot, the BS 102 may perform a LBT test on each subband and obtain the result of the LBT test on each subband. For example, the result of LBT test on Subband 0 is failed, that is, Subband 0 has a failed channel access procedure. While, the results of LBT tests on Subband 1, Subband 2, and Subband 3 are successful, that is, Subband 1, Subband 2, and Subband 3 have successful channel access procedures. In Slot 1, Slot 2, and Slot 3, wideband-based resource mapping may be used on Subband 1, Subband 2, and Subband 3 that passed the LBT tests in the initial slot. In another example, assuming Subband 0 with a failed channel access procedure in the initial slot, the BS 102, for example, the first BS 102a or the second BS 102b may also perform a LBT test on Subband 0 in slot 1, and once the result of the LBT test on Subband 0 is successful, the BS 102 may transmit data on this subband.

Consequently, the UE 101, for example, the first UE 101a or the second UE 101b may determine the type of resource mapping in one BS-acquired COT by determining whether the slot is an initial slot. In the case that the slot is the initial slot, the UE may determine the type of resource mapping in this slot is subband-based resource mapping. Otherwise, in the case that the slot is a non-initial slot, the UE may determine the type of resource mapping in this slot is wideband-based resource mapping. The initial slot is determined based on at least one of the following: an initial signal, a preamble, a demodulation reference signal for physical downlink control channel, and decoding physical downlink control channel.

Alternatively, to allow less stringent processing capability at the BS side, a time offset between the initial slot and the first subsequent slot where wideband-based resource mapping is used, can be applied for a DL transmission. The time offset may be one or more slots, which may be particularly applicable for mini-slot operation, or for large subcarrier spacings that result in a short slot duration. In an embodiment of the present disclosure, such a time offset may be transmitted by the BS 102, for example, via RRC signaling.

Figure 7:
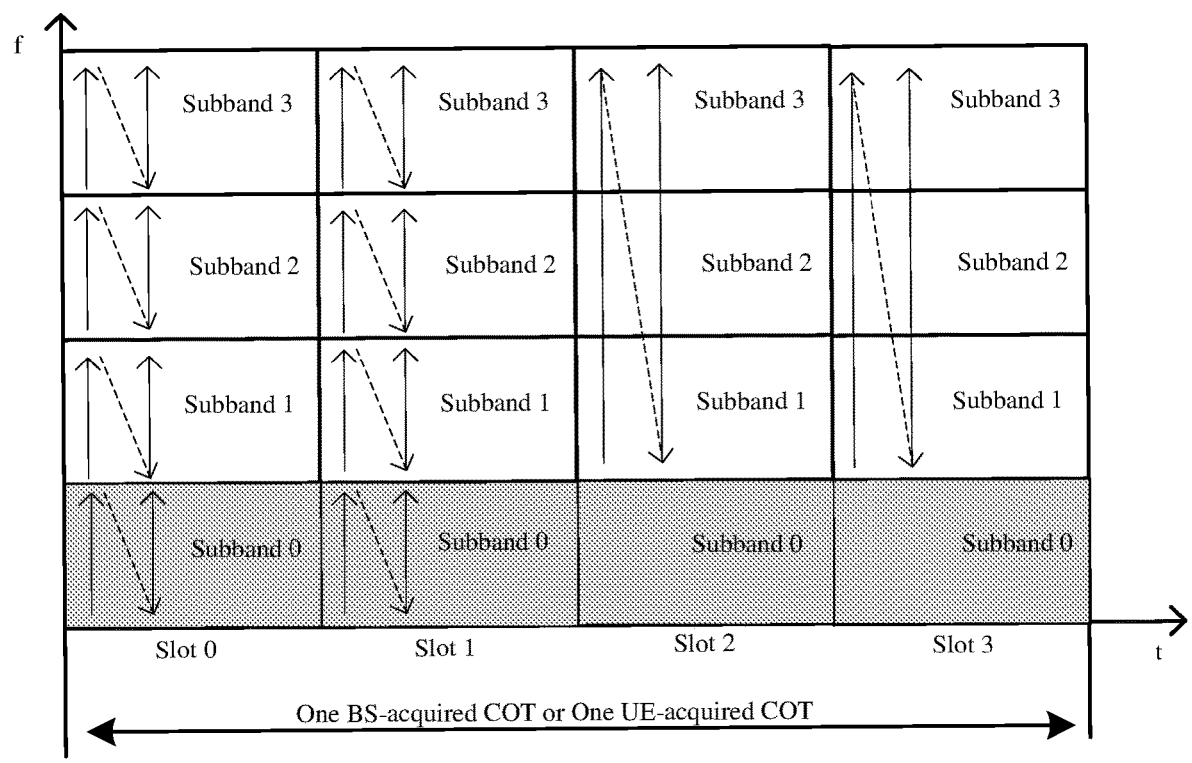
FIG. 7 is a schematic diagram illustrating switching the type of resource mapping according to another embodiment of the present disclosure.

For example, FIG. 7 illustrates how to determine the type of resource mapping in a BS-acquired COT or a UE-acquired COT in the case that there is a time offset, wherein "f" means frequency domain and "t" means time domain. Similarly, only one BS-acquired COT or a UE-acquired COT is illustrated in FIG. 7. Specifically, FIG. 7 is a schematic diagram illustrating switching the type of resource mapping according to another embodiment of the present disclosure. The main difference between FIG. 6 and FIG. 7 is that the duration of two slots, for example, Slot 0 and Slot 1 in FIG. 7 is configured by RRC signaling as the time offset.

In FIG. 7, subband-based resource mapping may be used in the initial slot and the subsequent slots until the first slot where wideband-based resource mapping is applied. For example, assuming a two-slot time offset, subband-based resource mapping may be used in Slot 0 and Slot 1, while wideband-based resource mapping may be used in Slot 2 and Slot 3.

Consequently, the UE 101 may determine the type of resource mapping in one BS-acquired COT by determining whether the slot is an initial slot or within the time offset from the initial slot. In the case that the slot is the initial slot or within the duration of the time offset from the initial slot, the UE 101 may determine the type of resource mapping in this slot is subband-based resource mapping. Otherwise, in the case that the slot neither is the initial slot nor within the duration of the time offset from the initial slot, the UE 101 may determine the type of resource mapping in this slot is wideband-based resource mapping.

In some embodiments of the present disclosure, the step 304 may be performed by a BS 102. According to an embodiment of the present disclosure, the subband-based resource mapping is always used during the uplink transmission, and thus the BS 102 may determine the type of the resource mapping to be the subband-based resource mapping. According to another embodiment of the present disclosure, the type of the resource mapping for uplink transmission may be determined by the BS 102 in advance and then it may transmit an indicator in the DCI to indicate the type of the resource mapping to a UE 101. According to yet another embodiment of the present disclosure, the BS 102 may receive an indicator in uplink control information (UCI), wherein the indicator may indicate the type of resource mapping of the TB. The indicator in UCI may be one bit with a value "0" or "1". For example, the value "0" may indicate the type of the resource mapping is subband-based resource mapping and the value "1" may indicate that the type of the resource mapping is wideband-based resource mapping. In another example, the value "1" may indicate the type of the resource mapping is subband-based resource mapping and the value "0" may indicate that the type of the resource mapping is wideband-based resource mapping.

According to yet another embodiment of the present disclosure, the type of resource mapping of the TB may be determined being subband-based resource mapping in response to the data received in an initial slot, while being wideband-based resource mapping in response to the data received in a non-initial slot. Similar rule to BS-acquired COT shown in FIG. 6 can also be adopted for uplink transmission in UE-acquired COT, e.g., for UL scheduling or for configured grant transmission. A UE 101 may adopt subband-based resource mapping type in an initial slot and wideband based resource mapping type in a non-initial slot. For example, similar to one BS-acquired COT in FIG. 6, one UE-acquired COT may include four slots, i.e., Slot 0, Slot 1, Slot 2, and Slot 3. Slot 0 may refer to the initial slot. The "slot" herein may refer to "slot", "mini-slot", or "sub-slot." In each slot, four subbands, i.e., Subband 0, Subband 1, Subband 2, and Subband 3 are allocated for transmitting a TB. The subband-based resource mapping may only be used in the initial slot. In the initial slot, the UE 101 may perform a LBT test on each subband and obtain the result of the LBT on each subband. For example, the result of the LBT test on Subband 0 is failed, that is, Subband 0 has a failed channel access procedure. The results of LBT tests on Subband 1, Subband 2, and Subband 3 are successful, that is, Subband 1, Subband 2, and Subband 3 have successful channel access procedures. Then, in Slot 1, Slot 2, and Slot 3, the wideband-based resource mapping may be used in Subband 1, Subband 2, and Subband 3 that passed the LBT tests in the initial slot.

Consequently, the BS 102 may determine the type of resource mapping in one UE-acquired COT by determining whether the slot is an initial slot. In the case that the slot is the initial slot, the BS 102 may determine the type of resource mapping in this slot is subband-based resource mapping. Otherwise, in the case that the slot is a non-initial slot, the BS 102 may determine the type of resource mapping in this slot is wideband-based resource mapping. The initial slot is determined based on a DMRS for physical uplink shared channel.

Similarly, to allow less stringent processing capability at the UE side, a time offset between the initial slot and the first subsequent slot where wideband-based resource mapping is used, can be applied for an uplink transmission. The time offset can be one or more slots. In an embodiment of the present disclosure, such time offset may be transmitted by the BS 102 via RRC signaling. Similar to FIG. 7, in the case that the slot is the initial slot or within the duration of the time offset from the initial slot, the BS 102 may determine the type of resource mapping in this slot is subband-based resource mapping. Otherwise, in the case that the slot is neither the initial slot nor within the duration of the time offset from the initial slot, the BS 102 may determine the type of resource mapping in this slot is wideband-based resource mapping.

In step 306, the UE 101 or the BS 102 may decode the data based on the determined type of resource mapping. The UE 101 or the BS 102 may receive a signaling at least indicating a result of the channel access procedure of each subband of the second set of subbands. For example, in the case that the step 306 is performed by the BS 102, it may receive a signaling indicating a result of the channel access procedure of each subband of the second set of subbands from the UE 101. In the case that the step 306 is performed by the UE 101, it may receive a signaling indicating a result of the channel access procedure of each subband of the second set of subbands from the BS 102. The UE 101 or the BS 102 may decode the data based on the result of the channel access procedure. For example, the UE 101 or the BS 102 may only decode the data on the subbands with successful channel access procedure, i.e., the results of the LBT tests on these subbands are successful.

After decoding the data on the first set of subbands, the UE 101 or the BS 102 may transmit the CBG-based HARQ-ACK feedback for the TB. In the case that the data is transmitted by using a rate matching method, the UE 101 or the BS 102 may transmit the CBG-based HARQ-ACK feedback for the CBGs of the TB according to the decoding result. In the case that the data is transmitted by using a puncturing method, the HARQ-ACK feedback corresponding to CBGs of the TB on the subbands with failed channel access procedure are not transmitted by the transmitter side. Accordingly, the receiver side, for example, the UE 101 or the BS 102 may not receive the HARQ-ACK feedback for the CBGs on the subbands with failed channel access procedure. There are serval methods for transmitting HARQ-ACK feedback in the puncturing method.

In an embodiment of the present disclosure, the UE 101 or the BS 102 may feedback NACK bits for the CBGs on the subbands with failed channel access procedure. In this case, the HARQ-ACK codebook may include Acknowledgement (ACK) bits and/or NACK bits for CBGs on one or more subbands of the second set of subbands with successful channel access procedure, and the NACK bits for CBGs on one or more subbands of the second set of subbands with failed channel access procedure. After receiving the HARQ-ACK codebook, the transmitter may update a contention window size for the channel access procedure based on the HARQ-ACK codebook and ignore the NACK bits for CBGs on one or more subbands of the second set of subbands with failed channel access procedure. The contention window is applied in LBT Category 4, also named Type 1 channel access procedure in 3GPP Rel-14 and beyond, where a random backoff counter is generated within the contention window. The contention window corresponds to a priority class. One example on channel access priority class and corresponding contention window are listed in Table 1. The contention window size at the transmitter side is adjusted based on HARQ-ACK feedback from the receiver side. For example, if at least 80% of the HARQ-ACK feedback values for a reference slot set are NACK, the contention window size is doubled; otherwise, the contention window size is reset to the minimum value.

In another embodiment of the present disclosure, for a DL transmission, the UE may receive a signaling, for example DCI, indicating a result of the channel access procedure of each one of the second set of subbands. The DCI may be UE-specific for indicating the result of the channel access procedure of each one of the second set of subbands, or group common for indicating the result of the channel access procedure of each one of all the subbands. The UE may know which subband(s) has the failed channel access procedure, and may not feedback NACK bits for the CBGs on the subband(s) with failed channel access procedure so as to reduce the HARQ-ACK codebook size. In this case, the HARQ-ACK codebook only includes ACK bits and/or NACK bits for CBGs on one or more subbands of the second set of subbands with successful channel access procedure.

TABLE 1

Channel Access Priority Class for UL

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1: For p = 3, 4, $T_{ulm\ cot,p}$ = 10 ms if the higher layer parameter 'absenceOfAnyOtherTechnology-rl4' indicates TRUE, otherwise, $T_{ulm\ cot,p}$ = 6 ms.
NOTE 2: When $T_{ulm\ cot,p}$ = 6 ms it may be increased to 8 ms by inserting one or more gaps. The minimum duration of a gap shall be 100 µs. The maximum duration before including any such gap shall be 6 ms.

In yet another embodiment of the present disclosure, for a scheduled-based UL transmission, i.e., the UL transmission is scheduled by a BS 102, the BS 102 may receive a signaling, for example a UCI, indicating a result of the channel access procedure of each subband of the second set of subbands from the UE 101. The BS 102 may know which subband(s) has the failed channel access procedure. The BS 102 may not feedback NACK bits for the CBGs on the subband(s) with failed channel access procedure so as to reduce the HARQ-ACK codebook size. In addition, the BS 102 may not schedule retransmission in UL grant for the subband(s) with failed failed channel access procedure so as to reduce the UL grant payload size or avoid unnecessary UL grant. In this case, the HARQ-ACK codebook can only include ACK bits and/or NACK bits for CBGs on one or more subbands of the second set of subbands with successful channel access procedure.

In yet another embodiment of the present disclosure, for the configured granted UL transmission, i.e., UL grants are preconfigured for the UL transmission, the BS 102 may receive a signaling, for example a UCI, indicating a result of the channel access procedure of each subband of the second set of subbands from the UE 101. The BS 102 may know which subband(s) has the failed channel access procedure. Accordingly, the BS 102 may not feedback NACK bits for the CBGs on the subband(s) with failed channel access procedure so as to reduce the HARQ-ACK codebook size. In addition, the BS 102 may not schedule retransmission in UL grant for the subband(s) with failed channel access procedure so as to reduce the UL grant payload size or avoid unnecessary UL grant. In this case, the HARQ-ACK codebook can only include ACK bits and/or NACK bits for CBGs on one or more subbands of the second set of subbands with successful channel access procedure.

Figure 8:
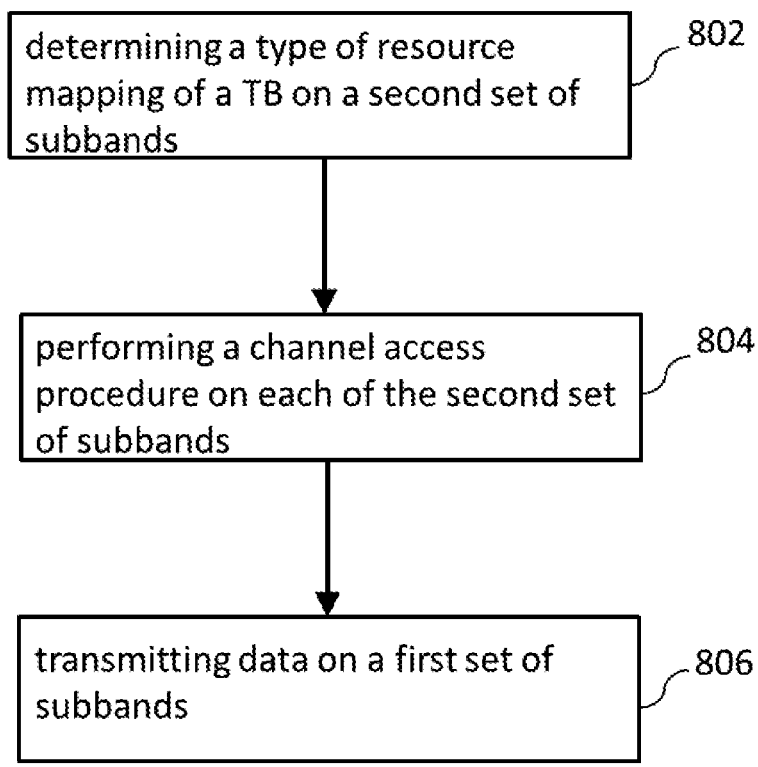
FIG. 8 is a flow chart illustrating a method for resource mapping in unlicensed spectrum according to another embodiment of the present disclosure.

FIG. 8 is a flow chart illustrating a method for resource mapping in unlicensed spectrum according to another embodiment of the present disclosure. The method may be implemented in a UL transmission by a UE 101 or in a DL transmission by a BS 102 in an exemplary wireless communication system 100 as shown in FIG. 1.

As shown in FIG. 8, in step 802, the UE 101 or the BS 102 may determine a type of resource mapping of a TB on a second set of subbands, and the second set of subbands are allocated for the TB. The resource mapping may include mapping modulated complex symbols of the TB to resource blocks of the second set of subbands.

In some embodiments of the present disclosure, the wideband carrier includes a plurality of subbands, and the second set of subbands may be a portion or all of the plurality of subbands. Each subband of the second set of subbands may have the same or different bandwidths, which may be less than, equal to, or larger than 20 MHz. In a preferred embodiment of the present disclosure, each subband has the same bandwidth in frequency, for example 20 MHz. Each subband of the second set of subbands may include a positive integer number of CBGs. That is, the CBG construction is restricted within each subband and not across the subband boundary of each subband.

In some embodiments of the present disclosure, the type of resource mapping may include subband-based resource mapping. According to an embodiment of the present disclosure, the subband-based resource mapping may include mapping the modulated complex symbols to the resource blocks in an increasing index order of subbands of the second set of subbands. Within each subband of the second set of subbands, the mapping may be performed first in frequency domain and then in time domain. According to another embodiment of the present disclosure, the subband-based resource mapping may include mapping the modulated complex symbols to the resource blocks in an increasing index order of subbands of the second set of subbands. Within each subband of the second set of subbands, the mapping is performed first in frequency domain in an increasing index order of the subcarriers of the subband and then in time domain. An example of the subband-based resource mapping can be the same as that illustrated in FIG. 4.

In some embodiments of the present disclosure, the type of resource mapping may include wideband-based resource mapping. According to an embodiment of the present disclosure, the wideband-based resource mapping may include mapping the modulated complex symbols to the resource blocks first in frequency domain across all subbands of the second set of subbands and then in time domain. According to an embodiment of the present disclosure, the wideband-based resource mapping may include mapping the modulated complex symbols to the resource blocks first in frequency domain in an increasing index order of the subcarriers of the second set of subbands and then in time domain. An example of the subband-based resource mapping can be the same as that illustrated in FIG. 5.

In some embodiments of the present disclosure, the step 802 may be performed by a UE 101. According to an embodiment of the present disclosure, the UE 101 may always use the subband-based resource mapping for uplink transmission. According to another embodiment of the present disclosure, the UE 101 may receive a RRC signaling indicating the type of resource mapping of the TB for uplink transmission from the BS 102. According to yet another embodiment of the present disclosure, the UE 101 may receive an indicator in DCI, wherein the indicator may indicate the type of resource mapping of the TB for uplink transmission. The indicator in DCI may be one bit with a value "0" or "1". For example, the value "0" may indicate the type of the resource mapping is subband-based resource mapping and the value "1" may indicate that the type of the resource mapping is wideband-based resource mapping. In another example, the value "1" may indicate the type of the resource mapping is subband-based resource mapping and the value "0" may indicate that the type of the resource mapping is wideband-based resource mapping. According to yet another embodiment, the type of the resource mapping for uplink transmission may be determined by the UE 101 itself and the UE 101 may transmit an indicator in the UCI to indicate the type of the resource mapping for uplink transmission to BS 102. The indicator in UCI may be one bit with a value "0" or "1." For example, the value "0" may indicate the type of the resource mapping is subband-based resource mapping and the value "1" may indicate that the type of the resource mapping is wideband-based resource mapping. In another example, the value "1" may indicate the type of the resource mapping is subband-based resource mapping and the value "0" may indicate that the type of the resource mapping is wideband-based resource mapping.

According to yet another embodiment of the present disclosure, the type of resource mapping of the TB may be determined being subband-based resource mapping in response to the data transmitted in an initial slot and being wideband-based resource mapping in response to the data transmitted in a non-initial slot. To assist a BS 102 to determine whether a slot is an initial slot or a non-initial slot, the UE 101 may transmit a DMRS for PUSCH for indicating the initial slot. After receiving the DMRS for PUSCH, the BS 102 may determine the type of resource mapping in a UE-acquired COT according to the exemplary embodiments in FIG. 6 and FIG. 7.

In some embodiments of the present disclosure, the step 802 may be performed by a BS 102. According to an embodiment of the present disclosure, the subband-based resource mapping can always be used during the downlink transmission, and thus the BS 102 may determine the type of the resource mapping to be the subband-based resource mapping. According to another embodiment of the present disclosure, the type of the resource mapping for downlink transmission may be determined by the BS 102 itself and then it may transmit an indicator in the DCI to indicate the type of the resource mapping to the UE 101. According to yet another embodiment of the present disclosure, the type of resource mapping of the TB may be determined being subband-based resource mapping in response to the data transmitted in an initial slot and being wideband-based resource mapping in response to the data transmitted in a non-initial slot. To assist a UE 101 to determine whether the slot is an initial slot or a non-initial slot, the BS 102, for example, the first BS 102*a* or the second BS 102*b* may transmit at least one of the following for indicating the initial slot: an initial signal; a preamble; a DMRS for physical downlink control channel; and physical downlink control channel After receiving the above signals, the UE 101 may determine the type of resource mapping in a BS-acquired COT according to the exemplary embodiments in FIG. 6 and FIG. 7.

In step 804, the UE 101 or the BS 102 may perform a channel access procedure on each subband of the second set of subbands. The channel access procedure may refer to a LBT test or a CCA test. According to a result of the LBT test, at least one subband of the second set of subbands, for example, a first set of subbands may be available for uplink or downlink transmission, which means the result of the LBT test of the first set of subbands is successful. In other words, a first set of subbands has successful channel access procedure(s). The remaining subbands of the second set of subbands may have failed channel access procedure, that is, the results of the LBT test of the remaining subbands may be failed.

In step 806, the UE 101 or the BS 102 may transmit the data on a first set of subbands based on the determined type of resource mapping, and the data is a part of the TB.

In some embodiments of the present disclosure, the step 806 may be performed by a UE 101. In this case, the data may be uplink transmission data, for example the data in PUSCH. The UE 101 may transmit the data on the first set of subbands by using a rate matching method or puncturing method. In the case of using the rate matching method, all data of the TB may be transmitted on the first set of subbands. In the case of using the puncturing method, instead of all data of the TB, a portion of TB, for example, the data which has been prepared for transmitting on the first set of subbands may be transmitted on the first set of subbands. Correspondingly, the data may be a portion of the TB or all of the TB.

In some embodiments of the present disclosure, the step 806 may be performed by a BS 102. In this case, the data may be downlink transmission data, for example the data in PDSCH. The BS 102 may transmit the data on the first set of subbands by using the rate matching method or puncturing method. In the case of using the rate matching method, all data of the TB may be transmitted on the first set of subbands. In the case of using the puncturing method, instead of all data of the TB, a portion of the TB, for example, the data which has been prepared for transmitting on the first set of subbands may be transmitted on the first set of subbands. Correspondingly, the data may be a portion of the TB or all of the TB.

The UE 101 or the BS 102 may transmit a signaling indicating a result of the channel access procedure of each subband of the second set of subbands such that the receiver may use the result of the channel access procedure to decode the data and feedback HARQ-ACK codebook. For example, in the case that the step 806 is performed by the BS 102, it may transmit a signaling indicating a result of the channel access procedure of each subband of the second set of subbands to the UE 101. In the case that the step 806 is performed by the UE 101, it may transmit a signaling indicating a result of the channel access procedure of each subband of the second set of subbands to the BS 102.

After transmitting the data on the first set of subbands, the UE 101 or the BS 102 may receive the HARQ-ACK codebook for the TB. In the case that the data is transmitted by using a rate matching method, the UE 101 or the BS 102 may receive the HARQ-ACK codebook for the CBGs according to the decoding result and perform retransmission for the CBGs with NACK bits. In the case that the data is transmitted by using a puncturing method, the UE 101 and the BS 102 may receive the HARQ-ACK codebook and perform the corresponding transmission in serval situations.

In an embodiment of the present disclosure, the receiver side, for example, the UE 101 and the BS 102 may feedback NACK bits for the CBGs on the subbands with failed channel access procedure. In this case, the HARQ-ACK codebook received by the UE 101 or the BS 102 may include ACK bits and/or NACK bits for CBGs on one or more subbands of the second set of subbands with successful channel access procedure. The HARQ-ACK codebook received by the UE 101 or the BS 102 may also include the NACK bits for CBGs on one or more subbands of the second set of subbands with failed channel access procedure. After receiving the HARQ-ACK codebook, the transmitter may update a contention window size for the channel access procedure based on the HARQ-ACK codebook, and ignore the NACK bits for CBGs on one or more subbands of the second set of subbands with failed channel access procedure.

In another embodiment of the present disclosure, for DL transmission, the BS 102 may transmit a signaling, for example DCI, indicating a result of the channel access procedure of each subband of the second set of subbands. The DCI may be UE-specific for indicating the result of the channel access procedure of each subband of the second set of subbands, or group common for indicating the result of the channel access procedure of each one of all the subbands. The UE may know which subband(s) has the failed channel access procedure and may not feedback NACK bits for the CBGs on the subband(s) with failed channel access procedure so as to reduce the HARQ-ACK codebook size. In this case, the HARQ-ACK codebook only includes ACK bits and/or NACK bits for CBGs on one or more subbands of the second set of subbands with successful channel access procedure. After receiving the HARQ-ACK codebook, the BS 102 may perform retransmission for the CBGs with NACK bits and the CBGs on the subband(s) with failed channel access procedure.

In yet another embodiment of the present disclosure, for a scheduled-based UL transmission, i.e., the UL transmission is scheduled by a BS 102, the UE 101 may transmit a signaling, for example a UCI, indicating a result of the channel access procedure of each subband of the second set of subbands to the BS 102, for example the first BS 102a or the second BS 102b. The BS 102 may know which subband(s) has the failed channel access procedure. Accordingly, the BS 102 may not feedback NACK bits for the CBGs on the subband(s) with failed channel access procedure so as to reduce the HARQ-ACK codebook size. In this case, the HARQ-ACK codebook only includes ACK bits and/or NACK bits for CBGs on one or more subbands of the second set of subbands with successful channel access procedure. After receiving the HARQ-ACK codebook, the UE 101 may perform retransmission for the CBGs with NACK bits and the CBGs on the subband(s) with failed channel access procedure.

In yet another embodiment of the present disclosure, for the configured granted UL transmission, i.e., UL grants are preconfigured for the UL transmission, the UE 101, for example, the first UE 101a or the second UE 101b may transmit a signaling, for example UCI, indicating a result of the channel access procedure of each subband of the second set of subbands to the BS 102, for example the first BS 102a or the second BS 102b. The BS 102 may know which subband(s) has the failed channel access procedure. Accordingly, the BS 102 may not feedback NACK bits for the CBGs on the subband(s) with failed channel access procedure so as to reduce the HARQ-ACK codebook size. In this case, the HARQ-ACK codebook only includes ACK bits and/or NACK bits for CBGs on one or more subbands of the second set of subbands with successful channel access procedure. After receiving the HARQ-ACK codebook, the UE 101 may perform retransmission for the CBGs with NACK bits and the CBGs on the subband(s) with failed channel access procedure.

According to embodiments of the present disclosure, the resource mapping process described in TS 38. 211 may change. Specifically, passages marked with strikethrough (deletion) and underline (addition) throughout the following sections illustrate changes to the resource mapping process described in TS 38. 211.

6.3.1.6 Mapping to Virtual Resource Blocks

For each of the antenna ports used for transmission of the PUSCH, the block of complex-valued symbols $z^{(p)}(0), \ldots, z^{(p)}(M_{symp}^{ap}-1)$ shall be multiplied with the amplitude scaling factor $\beta_{PUSCH}$ in order to conform to the transmit power specified in [5, TS 38.213] and mapped in sequence starting with $z^{(p)}(0)$ to resource elements $(k',l)_{p,\mu,q}$ in the virtual resource blocks within subband q assigned for transmission which meet all of the following criteria, wherein q is the assigned subband index and q=0 is the assigned subband with the lowest subband index:

they are in the virtual resource blocks assigned for transmission, and the corresponding resource elements in the corresponding physical resource blocks are not used for transmission of the associated DM-RS, PT-RS, or DM-RS intended for other co-scheduled UEs as described in clause 6.4.1.1.3

The mapping to resource elements (k allocated for PUSCH according to [6, TS 38.214] shall be in increasing order of first the index k' over the assigned virtual resource blocks, where k'=0 is the first subcarrier in the lowest-numbered virtual resource block within subband q assigned for transmission, and then the index 1, with the starting position given by [6, TS 38.214].

After the resource mapping in subband q then continue same procedure in subband q+1 till the last assigned subband.

7.3.1.5 Mapping to Virtual Resource Blocks

The UE shall, for each of the antenna ports used for transmission of the physical channel, assume the block of complex-valued symbols $\gamma^{(p)}(0), \ldots, \gamma^{(p)}(M_{symb}^{aP}-1)$ conform to the downlink power allocation specified in [6, TS 38.214] and are mapped in sequence starting with $\gamma^{(p)}(0)$ to resource elements $(k',1)_{p,\mu,q}$ in the virtual resource blocks within subband q assigned for transmission which meet all of the following criteria, wherein q is the assigned subband index and q=0 is the assigned subband with the lowest subband index:

they are in the virtual resource blocks assigned for transmission;

the corresponding physical resource blocks are declared as available for PDSCH according to clause 5.1.4 of [6, TS 38.214];

the corresponding resource elements in the corresponding physical resource blocks are not used for transmission of the associated DM-RS or DM-RS intended for other co-scheduled UEs as described in clause 7.4.1.1.2;

not used for non-zero-power CSI-RS according to clause 7.4.1.5, except for non-zero-power CSI-RSs configured by the higher-layer parameter CSI-RS-Resource-Mobility in the MeasObjectNR IE and aperiodic non-zero-power CSI-RS resources if the corresponding physical resource blocks are for PDSCH scheduled by PDCCH with CRC scrambled by C-RNTI, MCS-C-RNTI, CS-RNTI, or PDSCH with SPS;

not used for PT-RS according to clause 7.4.1.2;

not declared as 'not available for PDSCH according to clause 5.1.4 of [6, TS 38.214].

The mapping to resource elements (k allocated for PDSCH according to [6, TS 38.214] and not reserved for other purposes shall be in increasing order of first the index k' over the assigned virtual resource blocks, where k'=0 is the first subcarrier in the lowest-numbered virtual resource block within subband q assigned for transmission, and then the index 1.

After the resource mapping in subband q then continue same procedure in subband q+1 till the last assigned subband.

Figure 9:
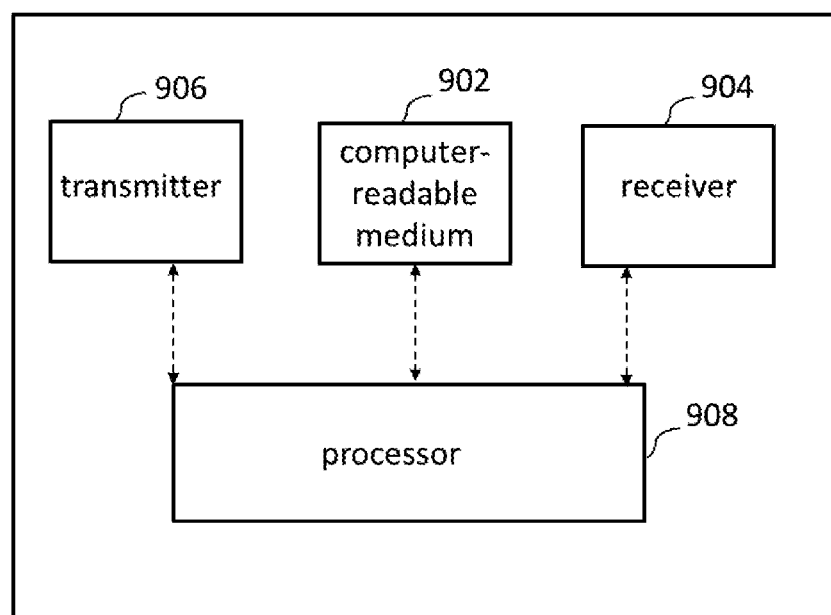
FIG. 9 illustrates a block diagram of an apparatus for resource mapping in unlicensed spectrum according to an embodiment of the present disclosure.

FIG. 9 illustrates a block diagram of an apparatus 900 for resource mapping in unlicensed spectrum according to an embodiment of the present disclosure. In an embodiment of the present disclosure, the apparatus 900 may be a UE 101, for example, the first UE 101a or the second UE 101b. In another embodiment of the present disclosure, the apparatus 900 may be a BS 102, for example, the first BS 102*a* or the second BS 102*b*.

Referring to FIG. 9, the apparatus 900 may include at least one non-transitory computer-readable medium 902, at least one receiver 904, at least one transmitter 906, and at least one processor 908. In some embodiment of the present disclosure, at least one receiver 904 and at least one transmitter 906 and be integrated into at least one transceiver. The at least one non-transitory computer-readable medium 902 may have computer executable instructions stored therein. The at least one processor 908 may be coupled to the at least one non-transitory computer-readable medium 902, the at least one receiver 904 and the at least one transmitter 906. The computer executable instructions can be programmed to implement a method with the at least one receiver 904, the at least one transmitter 906 and the at least one processor 908. The method can be a method according to an embodiment of the present disclosure, for example, the method shown in FIG. 3.

Figure 10:
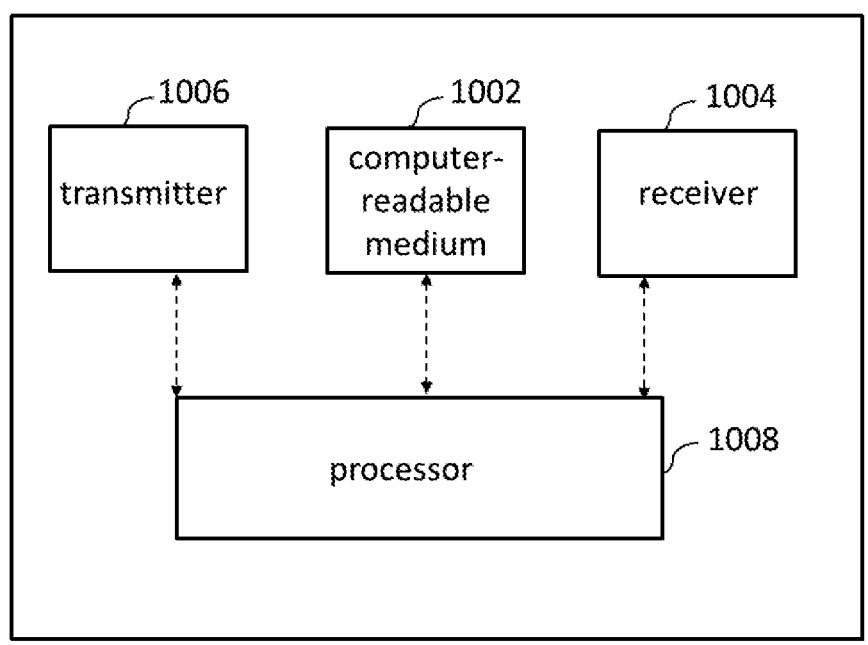
FIG. 10 illustrates a block diagram of an apparatus for resource mapping in unlicensed spectrum according to another embodiment of the present disclosure.

FIG. 10 illustrates a block diagram of an apparatus 1000 for resource mapping in unlicensed spectrum according to another embodiment of the present disclosure. In an embodiment of the present disclosure, the apparatus 100 may be a UE 101, for example, the first UE 101*a* or the second UE 101*b*. In another embodiment, the apparatus 1000 may be a BS 102, for example, the first BS 102*a* or the second BS 102*b*.

Referring to FIG. 10, the apparatus 1000 may include at least one non-transitory computer-readable medium 1002, at least one receiver 1004, at least one transmitter 1006, and at least one processor 1008. In some embodiment of the present disclosure, at least one receiver 904 and at least one transmitter 906 and be integrated into at least one transceiver. The at least one non-transitory computer-readable medium 1002 may have computer executable instructions stored therein. The at least one processor 1008 may be coupled to the at least one non-transitory computer-readable medium 1002, the at least one receiver 1004 and the at least one transmitter 1006. The computer executable instructions can be programmed to implement a method with the at least one receiver 1002, the at least one transmitter 1004 and the at least one processor 1006. The method can be a method according to an embodiment of the present application, for example, the method shown in FIG. 8.

The method according to embodiments of the present disclosure can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present disclosure provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present disclosure.

An alternative embodiment preferably implements the methods according to embodiments of the present disclosure in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present disclosure provides a non-transitory, computer-readable storage medium having computer programmable instructions stored therein. The computer programmable instructions are configured to implement a method for emotion recognition from speech as stated above or other method according to an embodiment of the present disclosure.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

The invention claimed is:

1. A method comprising:
receiving data on a first set of subbands, wherein the data is a part of a transport block, the first set of subbands is a subset of a second set of subbands, the second set of subbands is allocated for the transport block, and each subband of the second set of subbands has been performed a channel access procedure;
determining a type of resource mapping of the transport block, wherein the resource mapping comprises mapping modulated complex symbols of the transport block to resource blocks of the second set of subbands; and
decoding the data based on the determined type of resource mapping.

2. The method of claim 1, wherein the type of resource mapping comprises subband-based resource mapping and the subband-based resource mapping comprises mapping the modulated complex symbols to the resource blocks in an increasing index order of subbands of the second set of subbands, and within each subbands of the second set of subbands, the mapping is performed first in frequency domain and then in time domain.

3. The method of claim 1, wherein the type of resource mapping comprises subband-based resource mapping and the subband-based resource mapping comprises mapping the modulated complex symbols to the resource blocks in an increasing index order of subbands of the second set of subbands, and within each subband of the second set of subbands, the mapping is performed first in frequency domain in an increasing index order of the subcarriers of the subband and then in time domain.

4. The method of claim 1, wherein the type of resource mapping further comprises wideband-based resource mapping, and the wideband-based resource mapping comprises mapping the modulated complex symbols to the resource blocks first in frequency domain across all subbands of the second set of subbands and then in time domain.

5. The method of claim 1, wherein the type of resource mapping further comprises wideband-based resource mapping, and the wideband-based resource mapping comprises mapping the modulated complex symbols to the resource blocks first in frequency domain in an increasing index order of the subcarriers of the second set of subbands and then in time domain.

6. The method of claim 1, wherein the type of resource mapping of the transport block is indicated by radio resource control signaling, an indicator in downlink control information, or an indicator in uplink control information.

7. The method of claim 1, further comprising receiving configuration information indicating a minimum time offset for switching the type of resource mapping from subband-based mapping to wideband-based resource mapping.

8. The method of claim 1, wherein the type of resource mapping in response to the data received in an initial slot and being wideband-based resource mapping in response to the data received in a non-initial slot.

9. The method of claim 8, wherein the initial slot is determined based on:
an initial signal;
a preamble;
a demodulation reference signal for a physical uplink shared channel;
a demodulation reference signal for physical downlink control channel;
decoding physical downlink control channel;
or some combination thereof.

10. The method of claim 1, further comprising receiving a signaling indicating a result of the channel access procedure of each subband of the second set of subbands.

11. The method of claim 10, further comprising:
transmitting a hybrid automatic repeat request acknowledgement codebook corresponding to the transport block, wherein the hybrid automatic repeat request acknowledgement codebook only comprises acknowledgement bits and/or non-acknowledgement bits for code block groups on one or more subbands of the second set of subbands with successful channel access procedure.

12. A method comprising:
determining a type of resource mapping of a transport block on a second set of subbands allocated to transmit the transport block, wherein the resource mapping comprises mapping modulated complex symbols of the transport block to resource blocks of the second set of subbands;
performing a channel access procedure on each subband of the second set of subbands; and
transmitting data on a first set of subbands, wherein the data is a part of the transport block, and the first set of sbubbands comprises one or more subbands of the second set of subbands with successful channel access procedure.

13. The method of claim 12, wherein the type of resource mapping comprises subband-based resource mapping and the subband-based resource mapping comprises mapping the modulated complex symbols to the resource blocks in an increasing index order of subbands of the second set of subbands, and within each subband of the second set of subbands, the mapping is performed first in frequency domain and then in time domain.

14. The method of claim 12, wherein the type of resource mapping comprises subband-based resource mapping and the subband-based resource mapping comprises mapping the modulated complex symbols to the resource blocks in an increasing index order of subbands of the second set of subbands, and within each subband of the second set of subbands, the mapping is performed first in frequency domain in an increasing index order of the subcarriers of the subband and then in time domain.

15. The method of claim 12, wherein the type of resource mapping further comprises wideband-based resource mapping, and the wideband-based resource mapping comprises mapping the modulated complex symbols to the resource blocks first in frequency domain across all subbands of the second set of subbands and then in time domain.

16. The method of claim 12, wherein the type of resource mapping further comprises wideband-based resource mapping, and the wideband-based resource mapping comprises mapping the modulated complex symbols to the resource blocks first in frequency domain in an increasing index order of subcarriers of the second set of subbnads and then in time domain.

17. The method of claim 12, wherein the type of resource mapping of the transport block is indicated via radio resource control signaling, an indicator in downlink control information, or an indicator in uplink control information.

18. The method of claim 12, wherein the type of resource mapping of the transport block is determined to be subband-based resource mapping in response to the data transmitted in an initial slot and to be wideband-based resource mapping in response to the data transmitted in a non-initial slot.

19. The method of claim 12, further comprising transmitting a signaling indicating a result of the channel access procedure of each subband of the second set of subbands.

20. The method of claim 12, further comprising:
receiving a hybrid automatic repeat request acknowledgement codebook corresponding to the transport block; and
updating a contention window size for the channel access procedure based on the hybrid automatic repeat request acknowledgement codebook and ignoring non-acknowledgment bits for code block groups on one or more subbands of the second set of subbands with failed channel access procedure.

* * * * *